United States Patent
Ranasinghe et al.

(10) Patent No.: US 6,526,758 B2
(45) Date of Patent: Mar. 4, 2003

(54) METHOD AND APPARATUS FOR POWER AUGMENTATION FOR GAS TURBINE POWER CYCLES

(75) Inventors: Jatila Ranasinghe, Niskayuna, NY (US); Robert Russell Priestley, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 45 days.

(21) Appl. No.: 09/835,841

(22) Filed: Apr. 17, 2001

(65) Prior Publication Data

US 2001/0047649 A1 Dec. 6, 2001

Related U.S. Application Data

(60) Provisional application No. 60/203,930, filed on May 12, 2000.

(51) Int. Cl.$^7$ .................................. F02C 3/30
(52) U.S. Cl. ..................... 60/775; 60/39.55; 60/726
(58) Field of Search ..................... 60/39.48, 39.49, 60/39.53, 39.55, 39.56, 39.58, 39.59, 726, 775

(56) References Cited

U.S. PATENT DOCUMENTS

| | | |
|---|---|---|
| 3,747,336 A | 7/1973 | Dibelius et al. |
| 5,349,810 A | 9/1994 | Landälv |
| 5,386,686 A | 2/1995 | Chrëtien et al. |
| 5,513,488 A | 5/1996 | Fan |
| 5,622,044 A | 4/1997 | Bronicki et al. |
| 5,680,752 A | 10/1997 | Skog |
| 5,778,675 A | 7/1998 | Nakhamkin |
| 6,038,849 A | 3/2000 | Nakhamkin et al. |
| 6,134,873 A | 10/2000 | Nakhamkin et al. |
| 6,244,037 B1 | 6/2001 | Nakhamkin et al. |
| 6,389,793 B1 * | 5/2002 | Priestly ............ 60/775 |

FOREIGN PATENT DOCUMENTS

| JP | 07-049039 A | 2/1995 |
|---|---|---|
| JP | 8158890 A | 6/1996 |

* cited by examiner

*Primary Examiner*—Louis J. Casaregola
(74) *Attorney, Agent, or Firm*—Nixon & Vanderhye P.C.

(57) ABSTRACT

A land based gas turbine plant includes a turbine compressor, a turbine section, and a combustor between the compressor and the turbine section. A heat recovery boiler incorporating at least one heat exchange section is arranged to receive exhaust gas from the turbine section, the heat recovery boiler receiving water passed in heat exchange relationship with the exhaust gas to produce steam. An external compressor supplies augmenting combustion air that is mixed with the steam produced in the heat recovery boiler to produce a mixture of steam and air that is injected into the combustor.

10 Claims, 3 Drawing Sheets

METHOD AND APPARATUS FOR POWER AUGMENTATION FOR GAS TURBINE POWER CYCLES

This application claims the benefit of U.S. provisional application No. 60/203,930 filed on May 12, 2000.

This invention relates to supplying a mixture of augmenting compressed air and steam to a combustion turbine for power augmentation.

BACKGROUND OF THE INVENTION

The output or capacity of a combustion turbine usually falls off with increasing temperature at the inlet to the compressor component. Specifically, the capacity of the compressor component to supply air to the combustion process and subsequent expansion through the turbine is reduced as the compressor inlet temperature is increased (usually due to increased ambient temperature). Thus, the turbine component and combustion component of the combustion turbine usually have the capability to accept more compressed fluid than the compressor component can supply when operating above a certain inlet temperature.

BRIEF SUMMARY OF THE INVENTION

The present invention provides a design method for simple and combined cycle gas turbine power plants, to improve the output power during high ambient temperature operation. In particular, the invention concerns a method for increasing the mass flow through the turbine component or section by injection of a mixture of compressed air and steam at the gas turbine compressor discharge and/or in the combustion system, thereby improving the power output of the gas turbine power plant. In addition to power output, the thermodynamic efficiency is also improved in simple cycle gas turbine power plants.

Power augmentation of gas turbine cycles with steam injection has been done previously. However, the maximum amount of steam injection may be limited to a certain percentage of the air flow through the gas turbine compressor. The gas turbine compressor air flow naturally reduces as ambient temperature increases, and, hence, the potential amount of steam injection is limited.

The invention described herein, proposes to use an external motor driven compressor and steam generated using the energy of the turbine exhaust gases to inject a steam-air mixture at the gas turbine compressor discharge or in the combustion system to increase the mass flow through the gas turbine, and thereby increase the power output of the power cycle.

The purpose of the Steam Air Injection Cycle in accordance with this invention is for gas turbine power augmentation at high ambient temperature conditions. In addition to power augmentation, the heat rate is also reduced due to the use of gas turbine exhaust heat for steam generation. Power augmentation with steam injection may be limited by the maximum steam injection limits of the dry low NOx combustion system. The injection of air with the off-base compressor, however, provides additional power augmentation capability for the gas turbine.

The compressor may include a closed loop intercooling system, where the heat absorbed by the cooling water in the intercooler is rejected to the ambient via a cooling tower in the closed loop cooling water system. The compressor may also include inlet guide vanes for air flow control, a modulating blow-off valve to protect from surging during periods of low process demand, and protection for overload conditions by limiting the maximum air flow.

In one exemplary embodiment, the steam and air mixture is supplied directly to the inlet of the combustor. In this embodiment, the steam is generated in a waste heat boiler where the feed water entering the boiler is superheated to a temperature of ~700° F. The feed water flow control valve is modulated to control feed water flow to be equal to the gas turbine flow demand, up to the maximum steam injection limit for the given operating condition.

The superheated steam and the injection air is mixed in a mixing Tee prior to injection to the gas turbine combustor through the steam injection ports.

In a second embodiment, the mixture of steam and air is reheated in an upstream section of the heat recovery boiler before it is supplied to the combustor inlet.

In a third embodiment, the compressed discharge air from the external compressor is heated to ~700° F. in a downstream section of the heat recovery boiler before it is mixed with the superheated steam.

Before the steam-air mixture is actually admitted to the on-base manifold, all upstream piping must complete a preheat sequence. An improperly preheated steam-air mixture injection system can potentially deliver condensate to the combustors, which could extinguish the flame or damage hardware. To ensure adequate preheating of the steam-air mixture injection system, hot air from the off-base compressor may be used to preheat the system. The steam-air mixture will not be admitted to the machine until the preheat conditions are satisfied.

Accordingly, in its broader aspects, the invention relates to a land based gas turbine plant comprising a turbine compressor, a turbine section, and a combustor between the compressor and the turbine section; a heat recovery boiler incorporating at least one heat exchange section arranged to receive exhaust gas from the turbine section, the heat recovery boiler receiving water passed in heat exchange relationship with the exhaust gas to produce steam; and an external compressor for supplying augmenting combustion air, wherein the steam produced in the heat recovery boiler is mixed with the augmenting combustion air to produce a mixture of steam and air that is injected into the combustor.

In another aspect, the invention relates to a land based gas turbine plant comprising a turbine compressor, a turbine section, and a combustor between the compressor and the turbine section; a heat recovery boiler incorporating at least one heat exchange section arranged to receive exhaust gas from the turbine section; and means for increasing mass flow through the turbine section to thereby improve power output of the gas turbine plant.

In still another aspect, the invention relates to a method of increasing mass flow through a turbine section of a land based gas turbine plant that includes a turbine compressor, the turbine section and a combustor, the method comprising: a) supplying compressed air from an external compressor; b) supplying steam generated by water passing in heat exchange relationship with exhaust gases from the turbine section; c) mixing the compressed air from the external compressor with the steam; and d) supplying a mixture of the compressed air and the steam to the combustor.

DETAILED DESCRIPTION OF THE INVENTION

Figure 1:
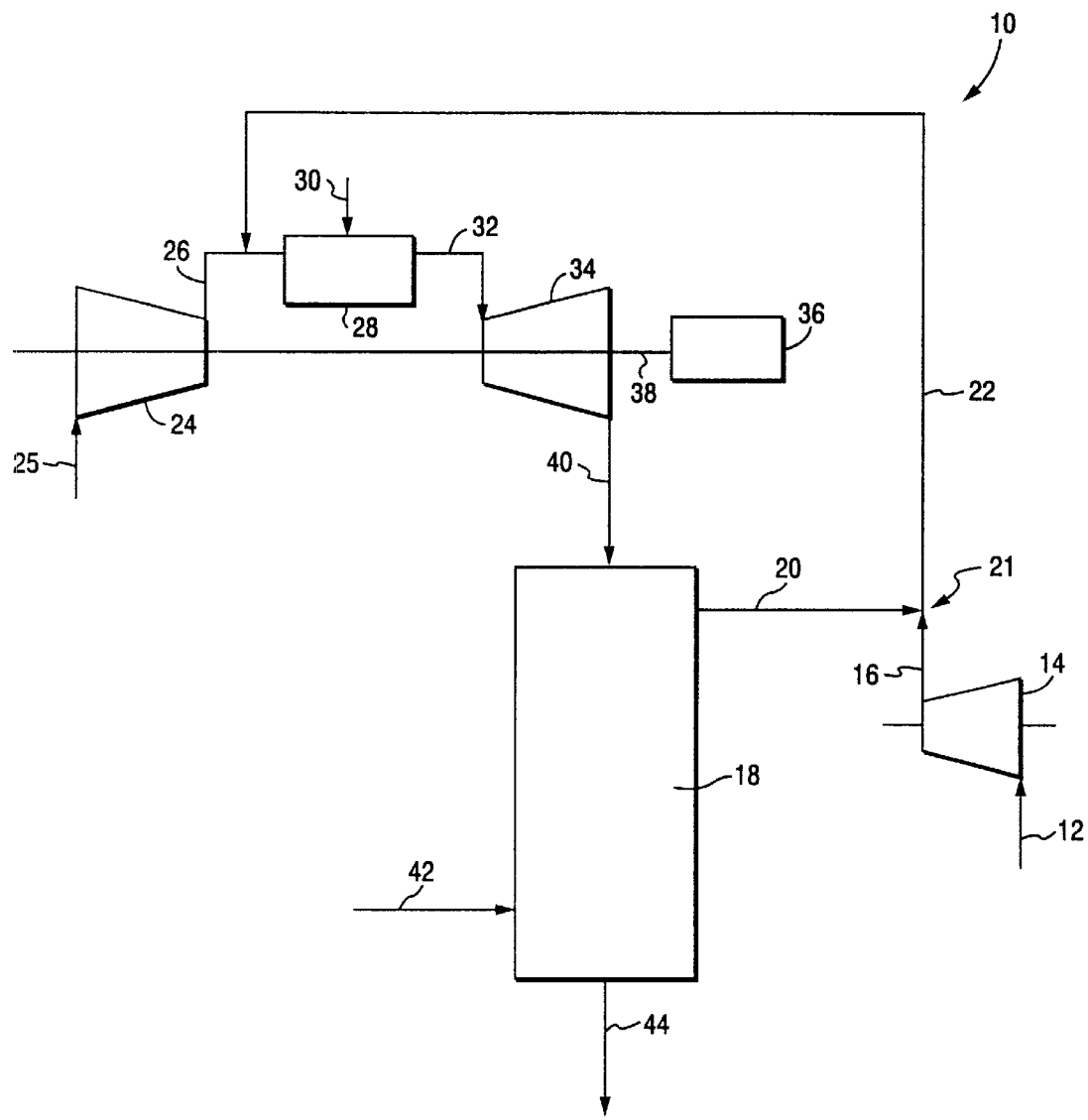
FIG. 1 is a schematic diagram of a moist air injection system for a simple cycle gas turbine in accordance with the first embodiment of the invention.

With reference to FIG. 1, a simple cycle gas turbine diagram 10 is illustrated. Ambient air is input via line 12 to an external compressor 14. Air discharged from the compressor 14 via line 16 is mixed at a mixing Tee (represented at 21) with superheated steam generated in a heat recovery boiler 18, via line 20. The resultant steam-air mixture is supplied via line 22 to line 26 between the discharge of turbine compressor 24 and the inlet to the combustor 28 where it mixes with the compressor discharge air before entering the combustor 28 (the latter is supplied with fuel via line 30). Combustion gases (via line 32) drive the turbine section 34 that in turn drives the generator or other equipment 36 via shaft 38.

The added mass flow of the mixture of steam and air increases the power output from the turbine section 34, resulting in a net power increase, even after taking into account the power required to drive the external or supplemental compressor 14. Exhaust gas from turbine section 34 provides the heat for the heat recovery boiler 18 via line 40, while water is supplied to the heat recovery boiler via line 42 for steam generation. The gas turbine exhaust exits the boiler via line 44.

Figure 2:
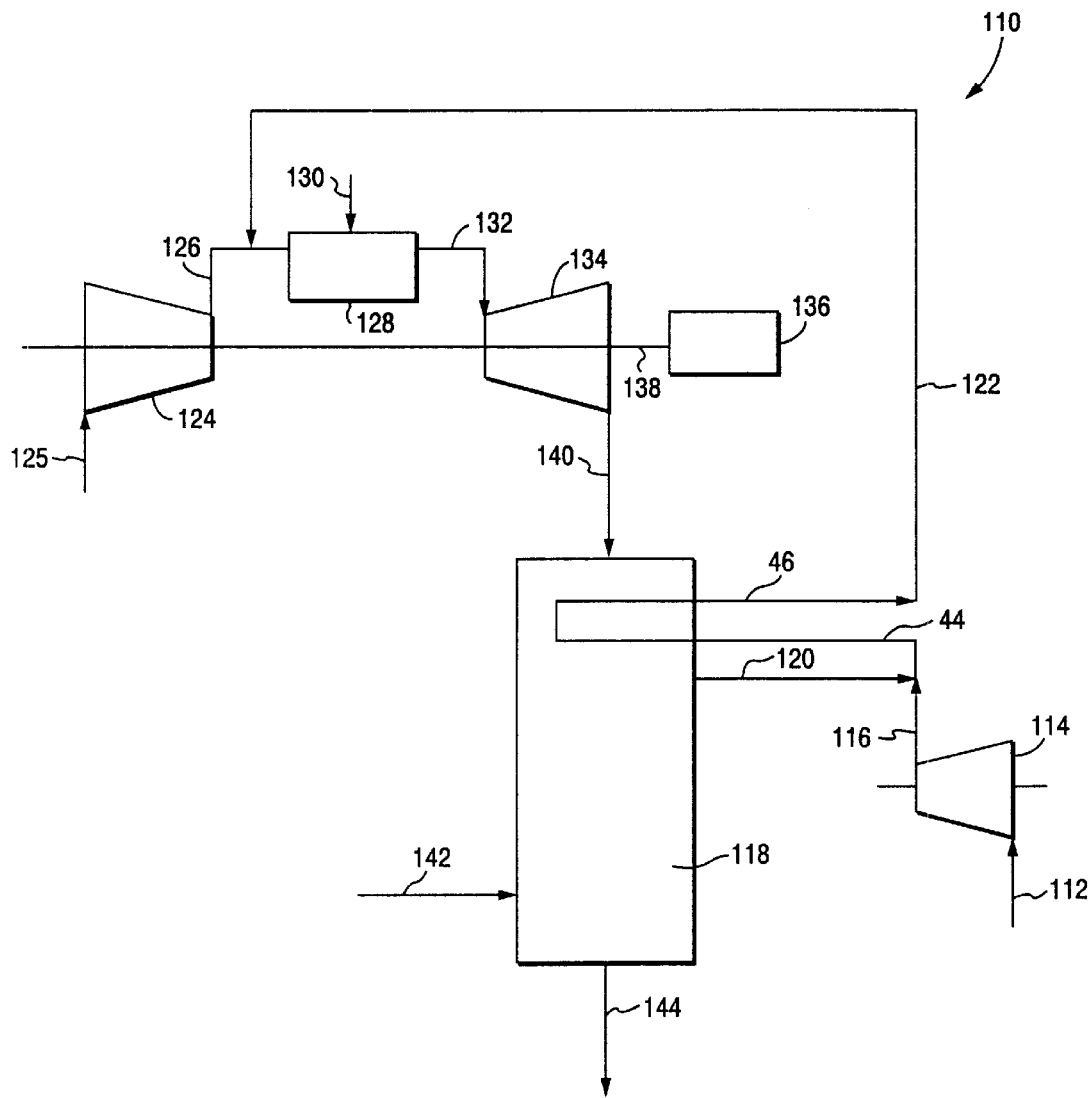
FIG. 2 is a schematic diagram of a moist air injection system in accordance with a second embodiment of the invention.

FIG. 2 illustrates a variation of the arrangement shown in FIG. 1 and, for convenience, reference numerals similar to those used in FIG. 1, but with the prefix "1" added, are used in FIG. 2 to designate corresponding elements. In FIG. 2, the steam-air mixture resulting from mixing the external compressor discharge air in line 116 and steam from the heat recovery boiler 118 via line 120, is further heated in an upstream section of the heat recovery boiler 118 via lines 44, 46 such that heat from the gas turbine exhaust is transferred to the steam-air mixture, prior to being mixed with the compressor discharge air from the turbine compressor 124. Heating the steam-air mixture in this manner, i.e., using gas turbine exhaust energy, further reduces fuel consumption and increases the thermodynamic efficiency of the power cycle.

Figure 3:
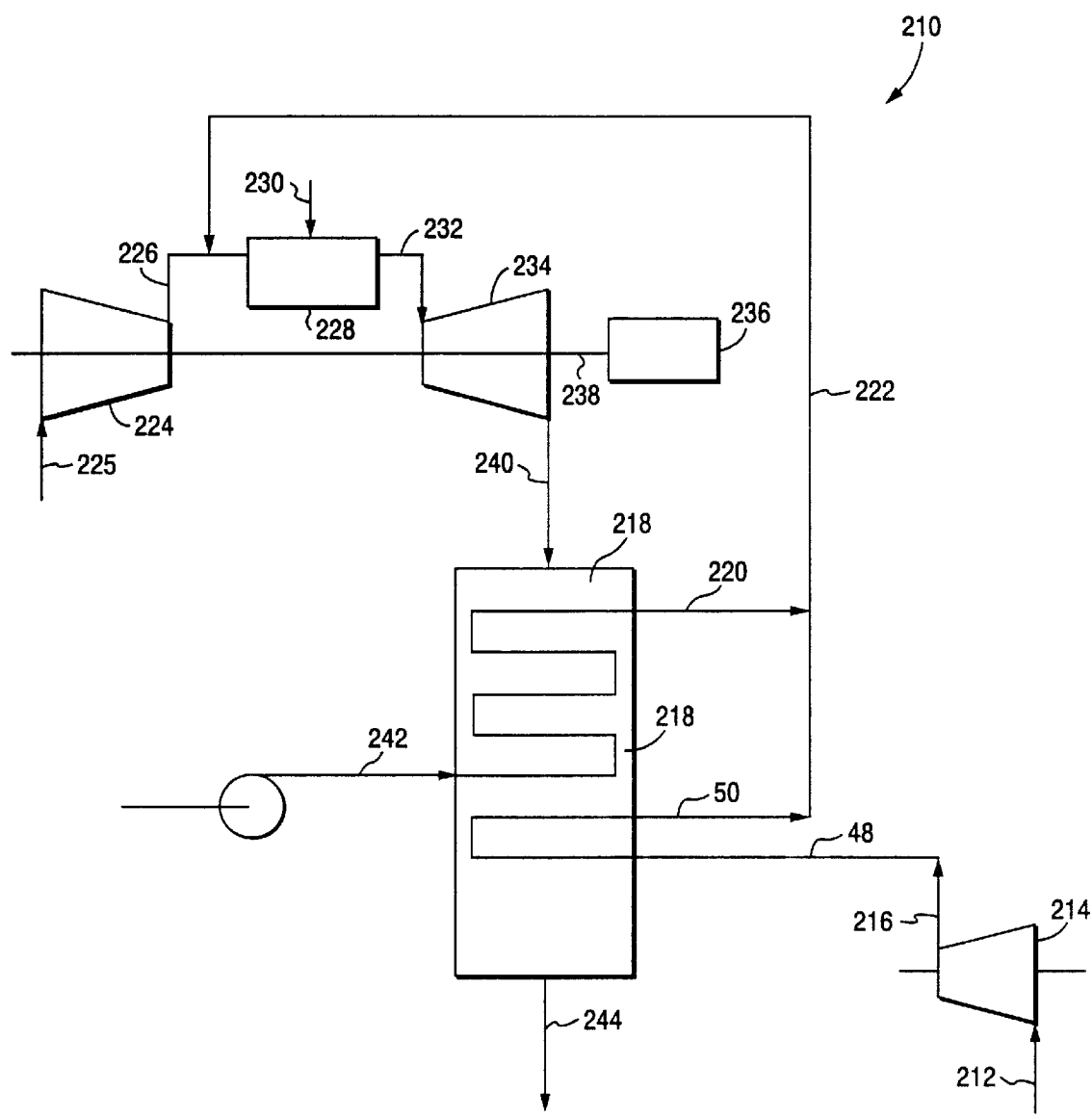
FIG. 3 illustrates a schematic diagram of a moist air injection system in accordance with a third embodiment of the invention.

FIG. 3 shows another variation of the arrangement shown in FIG. 1 and, for FIG. 3, reference numerals similar to those in FIG. 1, but with the prefix "2" added, are used to designate corresponding components. In FIG. 3, the compressor discharge air from the external compressor 214 is heated to ~700° F. in a downstream section of the heat recovery boiler 218 via lines 48, 50, before mixing with the superheated steam supplied via line 220, and before subsequent injection into the gas turbine combustion system via line 222.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A land based gas turbine plant comprising a turbine compressor, a turbine section, and a combustor between said compressor and said turbine section; a heat recovery boiler incorporating at least one heat exchange section arranged to receive exhaust gas from the turbine section and water from an external source, said heat recovery boiler receiving water passed in heat exchange relationship with said exhaust gas to produce steam; and an external compressor operatively connected to supply augmenting combustion air to the combustor, wherein means are provided for supplying the steam produced in the heat recovery boiler for mixing with the augmenting combustion air to produce a mixture of steam and air that is injected into the combustor.

2. The land based gas turbine of claim 1 wherein said mixture is supplied to a conduit supplying the combustion air from the turbine compressor to the combustor at a location between said turbine compressor and said combustor.

3. The land based gas turbine of claim 1 wherein the heat recovery boiler includes another heat exchange section and said mixture is heated in said another heat exchange section before it is introduced into said combustor.

4. The land based gas turbine of claim 3 wherein said another heat exchange section is located at an upstream end of said heat recovery boiler.

5. The land based gas turbine of claim 1 wherein said heat recovery boiler includes another heat exchange section at a downstream end thereof, and wherein said augmenting combustion air is heated in said heat exchange section before it is mixed with the steam produced in an upstream section of the heat recovery boiler.

6. A land based gas turbine plant comprising a turbine compressor, a turbine section, and a combustor between said compressor and said turbine section; a heat recovery boiler incorporating at least one heat exchange section arranged to receive exhaust gas from the turbine section; and means for increasing mass flow through said turbine section to thereby improve power output of the gas turbine plant.

7. A method of increasing mass flow through a turbine section of a land based gas turbine plant that includes an integral turbine compressor, the turbine section and a combustor, the method comprising:
   a) supplying compressed air from an external compressor;
   b) supplying steam generated by water passing in heat exchange relationship with exhaust gases from said turbine section;
   c) mixing said compressed air from said external compressor with said steam; and
   d) supplying a mixture of said compressed air and said steam to said combustor.

8. The method of claim 7 wherein said mixture is further mixed with air from said turbine compressor upstream of said combustor.

9. The method of claim 7 wherein said mixture is reheated in said heat recovery boiler prior to step d).

10. The method of claim 7 wherein said compressed air from said external compressor is heated in said heat recovery boiler prior to step c).

* * * * *